US008751741B2

(12) United States Patent
Velayudhan et al.

(10) Patent No.: US 8,751,741 B2
(45) Date of Patent: Jun. 10, 2014

(54) METHODS AND STRUCTURE FOR IMPLEMENTING LOGICAL DEVICE CONSISTENCY IN A CLUSTERED STORAGE SYSTEM

(75) Inventors: Vinu Velayudhan, Fremont, CA (US); James A. Rizzo, Austin, TX (US); Adam Weiner, Henderson, NV (US); Rakesh Chandra, Santa Clara, CA (US); Guolin Huang, Sunnyvale, CA (US)

(73) Assignee: LSI Corporation, Milpitas, CA (US)

( * ) Notice: Subject to any disclaimer, the term of this patent is extended or adjusted under 35 U.S.C. 154(b) by 247 days.

(21) Appl. No.: 13/432,232

(22) Filed: Mar. 28, 2012

(65) Prior Publication Data

US 2013/0067164 A1 Mar. 14, 2013

Related U.S. Application Data

(60) Provisional application No. 61/532,585, filed on Sep. 9, 2011.

(51) Int. Cl.
*G06F 12/00* (2006.01)
*G06F 3/06* (2006.01)
*G06F 13/42* (2006.01)

(52) U.S. Cl.
CPC .............. *G06F 3/0683* (2013.01); *G06F 3/067* (2013.01); *G06F 3/0631* (2013.01); *G06F 3/065* (2013.01); *G06F 2206/1012* (2013.01); *G06F 13/423* (2013.01)
USPC .......................................... 711/114; 711/162

(58) Field of Classification Search
CPC ..... G06F 3/067; G06F 3/0631; G06F 3/0635; G06F 3/0683; G06F 3/0665; G06F 3/065; G06F 3/0613; G06F 2206/1012; G06F 3/0617; G06F 3/0689; G06F 13/423; G06F 3/0653; G06F 3/0662
USPC .................................................. 711/114, 162
See application file for complete search history.

(56) References Cited

U.S. PATENT DOCUMENTS 6,487,646 B1 11/2002 Adams et al.
6,651,154 B1 11/2003 Burton et al.
(Continued)

OTHER PUBLICATIONS

"Common RAID Disk Data Format Specification" Version 2.0 Revision 19 SNIA Technical Position Mar. 27, 2009.

(Continued)

*Primary Examiner* — Hashem Farrokh
(74) *Attorney, Agent, or Firm* — Duft Bornsen & Fettig, LLP

(57) ABSTRACT

Methods and system are provided for exposing logical volumes to host systems and storage controllers in a consistent manner across a clustered storage system. One embodiment is a storage controller. The storage controller is operable to communicate with other storage controllers within the clustered storage system. The storage controller is further operable to generate a proposed Logical Unit Number (LUN) for a logical volume provisioned at the storage devices, and to communicate with each of the other storage controllers within the clustered storage system requesting that the other storage controllers determine if the proposed LUN is in use. If the proposed LUN is not in use, then storage controller assigns the proposed LUN to the logical volume. If the LUN is in use, then the storage controller generates a new proposed LUN and re-tries communication with the other storage controllers until a unique LUN is found.

18 Claims, 3 Drawing Sheets

(56) References Cited

U.S. PATENT DOCUMENTS

| | | |
|---|---|---|
| 6,738,872 B2 | 5/2004 | Van Huben et al. |
| 6,754,739 B1 | 6/2004 | Kessler et al. |
| 6,944,785 B2 | 9/2005 | Gadir et al. |
| 7,058,846 B1 | 6/2006 | Kelkar et al. |
| 7,213,102 B2 | 5/2007 | Buchanan, Jr. et al. |
| 7,418,550 B2 | 8/2008 | Hetrick et al. |
| 7,480,941 B1 | 1/2009 | Balasubramaniam et al. |
| 7,814,065 B2 | 10/2010 | Chan et al. |
| 7,971,094 B1 | 6/2011 | Benn et al. |
| 8,001,242 B2 | 8/2011 | Mild et al. |
| 8,041,735 B1 | 10/2011 | Lacapra et al. |
| 8,190,816 B2 | 5/2012 | Balasubramanian |
| 8,261,003 B2 | 9/2012 | Young et al. |
| 2002/0103964 A1 | 8/2002 | Igari |
| 2004/0148477 A1* | 7/2004 | Cochran ............. 711/162 |
| 2004/0205074 A1 | 10/2004 | Berkery et al. |
| 2005/0097324 A1 | 5/2005 | Mizuno |
| 2005/0125557 A1 | 6/2005 | Vasudevan et al. |
| 2005/0188421 A1 | 8/2005 | Arbajian |
| 2005/0240928 A1 | 10/2005 | Brown et al. |
| 2006/0080416 A1* | 4/2006 | Gandhi ............. 709/220 |
| 2007/0015589 A1 | 1/2007 | Shimizu |
| 2007/0067497 A1 | 3/2007 | Craft et al. |
| 2007/0210162 A1 | 9/2007 | Keen et al. |
| 2009/0119364 A1 | 5/2009 | Guillon |
| 2009/0222500 A1 | 9/2009 | Chiu et al. |
| 2010/0185874 A1 | 7/2010 | Robles et al. |
| 2010/0191873 A1 | 7/2010 | Diamant |
| 2010/0274977 A1 | 10/2010 | Schnapp et al. |
| 2011/0072228 A1* | 3/2011 | Nagata et al. ............. 711/162 |
| 2011/0178983 A1 | 7/2011 | Bernhard et al. |
| 2011/0225371 A1 | 9/2011 | Spry |
| 2012/0159646 A1 | 6/2012 | Hong Chi et al. |
| 2012/0216299 A1 | 8/2012 | Frank |

OTHER PUBLICATIONS

Ciciani et al. "Analysis of Replication in Distributed Database Systems" IEEE Transactions on Knowledge and Data Engineering, vol. 2 . No. 2 . Jun. 1990.

* cited by examiner

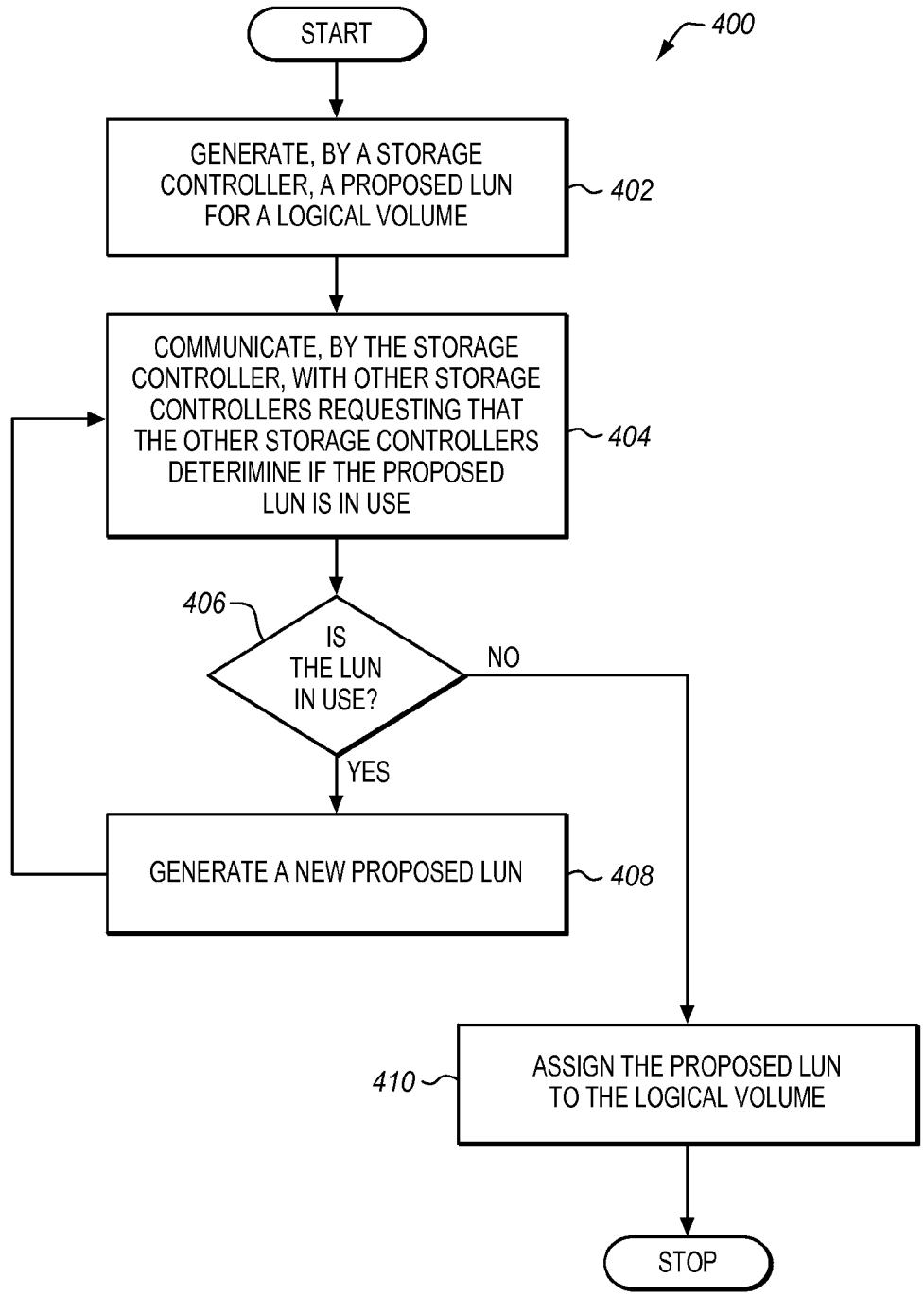

METHODS AND STRUCTURE FOR IMPLEMENTING LOGICAL DEVICE CONSISTENCY IN A CLUSTERED STORAGE SYSTEM

This patent claims priority to U.S. provisional Patent Application 61/532,585, filed on Sep. 9, 2011 and entitled "IO Shipping for RAID Virtual Disks Created On A Disk Group Shared Across Cluster", which is hereby incorporated by reference.

BACKGROUND

1. Field of the Invention

The invention relates generally to management of logical volumes in a storage system.

2. Related Patents

This patent application is related to the following commonly owned United States Patent Applications, all filed on the same date herewith and all of which are herein incorporated by reference:

U.S. patent application Ser. No. 11-1500, entitled METHODS AND STRUCTURE FOR TASK MANAGEMENT IN STORAGE CONTROLLERS OF A CLUSTERED STORAGE SYSTEM;

U.S. patent application Ser. No. 11-1409, entitled METHODS AND STRUCTURE FOR DIRECT PASS THROUGH OF SHIPPED REQUESTS IN FAST PATH CIRCUITS OF A STORAGE CONTROLLER IN A CLUSTERED STORAGE SYSTEM;

U.S. patent application Ser. No. 11-1444, entitled METHODS AND STRUCTURE FOR LOAD BALANCING OF BACKGROUND TASKS BETWEEN STORAGE CONTROLLERS IN A CLUSTERED STORAGE ENVIRONMENT;

U.S. patent application Ser. No. 11-1484, entitled METHODS AND STRUCTURE FOR TRANSFERRING OWNERSHIP OF A LOGICAL VOLUME BY TRANSFER OF NATIVE-FORMAT METADATA IN A CLUSTERED STORAGE ENVIRONMENT;

U.S. patent application Ser. No. 11-1502, entitled METHODS AND STRUCTURE FOR IMPROVED I/O SHIPPING IN A CLUSTERED STORAGE SYSTEM;

U.S. patent application Ser. No. 11-1504, entitled METHODS AND STRUCTURE FOR MANAGING VISIBILITY OF DEVICES IN A CLUSTERED STORAGE SYSTEM; and U.S. patent application Ser. No. 11-1557, entitled METHODS AND STRUCTURE FOR RESUMING BACKGROUND TASKS IN A CLUSTERED STORAGE ENVIRONMENT.

3. Discussion of Related Art

In the field of data storage, customers demand highly resilient data storage systems that also exhibit fast error recovery times. One type of storage system used to provide both of these characteristics is known as a clustered storage system.

A clustered storage system typically comprises a number of storage controllers, where each storage controller processes host Input/Output (I/O) requests directed to one or more logical volumes. The logical volumes reside on portions of one or more storage devices (e.g., hard disks) coupled with the storage controllers. Often, the logical volumes are configured as Redundant Array of Independent Disks (RAID) volumes in order to ensure an enhanced level of data integrity and/or performance.

A notable feature of clustered storage environments is that the storage controllers are capable of coordinating processing of host requests (e.g., by shipping I/O processing between each other) in order to enhance the performance of the storage environment. This includes intentionally transferring ownership of a logical volume from one storage controller to another. For example, a first storage controller may detect that it is currently undergoing a heavy processing load, and may assign ownership of a given logical volume to a second storage controller that has a smaller processing burden in order to increase the overall speed of the clustered storage system in handling I/O requests. Other storage controllers may then update information identifying which storage controller presently owns each logical volume. Thus, when an I/O request is received at a storage controller that does not own the logical volume identified in the request, the storage controller may "ship" the request to the storage controller that presently owns the identified logical volume.

FIG. 1 is a block diagram illustrating an example of a prior art clustered storage system 150. Clustered storage system 150 is indicated by the dashed box, and includes storage controllers 120, switched fabric 130, and logical volumes 140. Note that a "clustered storage system" (as used herein) does not necessarily include host systems and associated functionality (e.g., hosts, application-layer services, operating systems, clustered computing nodes, etc.). However, storage controllers 120 and hosts 110 may be tightly integrated physically. For example, storage controllers 120 may comprise Host Bus Adapters (HBA's) coupled with a corresponding host 110 through a peripheral bus structure of host 110. According to FIG. 1, hosts 110 provide I/O requests to storage controllers 120 of clustered storage system 150. Storage controllers 120 are coupled via switched fabric 130 (e.g., a Serial Attached SCSI (SAS) fabric or any other suitable communication medium and protocol) for communication with each other and with a number of storage devices 142 on which logical volumes 140 are stored.

FIG. 2 is a block diagram illustrating another example of a prior art clustered storage system 250. In this example, clustered storage system 250 processes I/O requests from hosts 210 received via switched fabric 230. Storage controllers 220 are coupled for communication with storage devices 242 via switched fabric 235, which may be integral with or distinct from switched fabric 230. Storage devices 242 implement logical volumes 240. Many other configurations of hosts, storage controllers, switched fabric, and logical volumes are possible for clustered storage systems as a matter of design choice. Further, in many high reliability storage systems, all the depicted couplings may be duplicated for redundancy. Additionally, the interconnect fabrics may also be duplicated for redundancy.

While clustered storage systems provide a number of performance benefits over more traditional storage systems described above, problems may arise when storage controllers share access to a logical volume. Logical volumes are typically identified to host systems and storage controllers using a Logical Unit Number (LUN). A LUN provides a reference to the logical volume for I/O requests. In a clustered storage system, typically one storage controller has "ownership" of a logical volume. The storage controller generates a local LUN to identify the logical volumes that the storage controller owns to its associated host system. When logical volumes are shared, each storage controller that "sees" the logical volume may utilize a different LUN to identify the shared logical volume to their respective host systems. This can be problematic for a number of reasons.

The first reason that this can be problematic is that utilizing different local LUNs to access the logical volume can cause confusion in users. For example, host system A may reference a logical volume as LUN-x, while host system B may reference the same logical volume as LUN-y. Thus, when a user changes between using host system A and using host system B, the same logical volume is referenced differently.

The second reason that the use of different local LUNs to access the same logical volume can be problematic is due to I/O shipping. As discussed above with respect to FIGS. 1 and 2, I/O requests in a clustered storage system may be shipped from storage controllers that do not own a logical volume to storage controllers that own the logical volume. When I/O shipping to a shared logical volume occurs, storage controllers may perform a number of LUN translations and LUN analysis as the I/O requests are shipped from one storage controller to another storage controller. This may occur because different storage controllers expose the shared logical volume to their respective host systems using different LUNs. In continuing with the example, consider that storage controller A is coupled with host system A. Storage controller A references the shared logical volume as LUN-x. In this example, storage controller A does not own the shared logical volume. Instead, the shared logical volume is owned by storage controller B that is coupled with host system B. Storage controller B references the shared volume as LUN-y. In this case, I/O requests generated by host system A use LUN-x as the target LUN, which are sent to storage controller A. Storage controller A is then tasked with analyzing the I/O request to determine which controller "owns" LUN-y (controller B in the example), translating the I/O requests from target LUN-x to target LUN-y, and ships the I/O request to storage controller B. This places a computational burden on the storage controllers in a clustered storage system.

Thus it is an ongoing challenge to reduce the computational burden on storage controllers within a clustered storage system.

SUMMARY

The present invention solves the above and other problems, thereby advancing the state of the useful arts, by providing methods and systems for storage controllers to coordinate with other peer storage controllers of a clustered storage system to generate LUNs for logical volumes that are unique within the clustered storage system. Specifically, according to the methods and systems, storage controllers utilize a peer to peer communication strategy to assign new LUNs to logical volumes. A storage controller generates a proposed LUN for a logical volume, and coordinates with other peer storage controllers to determine if the proposed LUN is in use. If the proposed LUN is in use, then a new LUN is generated and the storage controller re-tries coordinating with the other peer storage controllers to determine if the new LUN is in use. If the proposed LUN is not in use, then the storage controller assigns the proposed LUN to the logical volume. The LUN assigned to the logical volume may then be exposed to storage controllers and host systems across the clustered storage system in a consistent manner.

One aspect hereof provides for a plurality of storage controllers within a clustered storage system. Each of the storage controllers communicatively couples a host system with storage devices. Each of the controllers comprises an interface and a control unit. The interface communicates with other storage controllers within the clustered storage system. The control unit generates a proposed LUN for a logical volume provisioned at the storage devices, and communicates with each of the other storage controllers within the clustered storage system, requesting that the other storage controllers determine if the proposed LUN is in use. If the proposed LUN is not in use by the other storage controllers, then the control unit assigns the proposed LUN to the logical volume. If the proposed LUN is in use by at least one of the other storage controllers, then the control unit generates a new proposed LUN and re-tries communicating with each of the other storage controllers until a unique LUN is found.

Another aspect hereof provides a method operable on a plurality of storage controllers within a clustered storage system. In this aspect, each storage controller within the clustered storage system communicatively couples a host system with storage devices. According to the method, a storage controller generates a proposed LUN for a logical volume provisioned at the storage devices, and communicates with each of the other storage controllers within the clustered storage system requesting that the other storage controllers determine if the proposed LUN is in use. If the proposed LUN is not in use by the other storage controllers, then the storage controller assigns the proposed LUN to the logical volume. If the proposed LUN is in use by at least one of the other storage controllers, then the storage controller generates a new proposed LUN and re-tries communicating with each of the other storage controllers until a unique LUN is found.

Another aspect hereof provides for a storage controller within a clustered storage system. The storage controller communicatively couples a host system with storage devices. The storage controller comprises an interface and a control unit. The interface communicates with other storage controllers within the clustered storage system. The control unit receives a proposed LUN for a logical volume provisioned by another storage controller within the clustered storage system, and determines if the proposed LUN is in use by the storage controller. If the proposed LUN is in use by the storage controller, then the control unit transmits a message to the other storage controller indicating that the proposed LUN is in use. If the proposed LUN is not in use by the storage controller, then the control unit transmits a message to the other storage controller indicating that the proposed LUN is not in use.

BRIEF DESCRIPTION OF THE DRAWINGS

FIG. 4 is a flowchart describing an exemplary method in accordance with features and aspects hereof for coordinating with other peer storage controllers to assign a unique LUN to a logical volume within the clustered storage system.

DETAILED DESCRIPTION OF THE DRAWINGS

Figure 1:
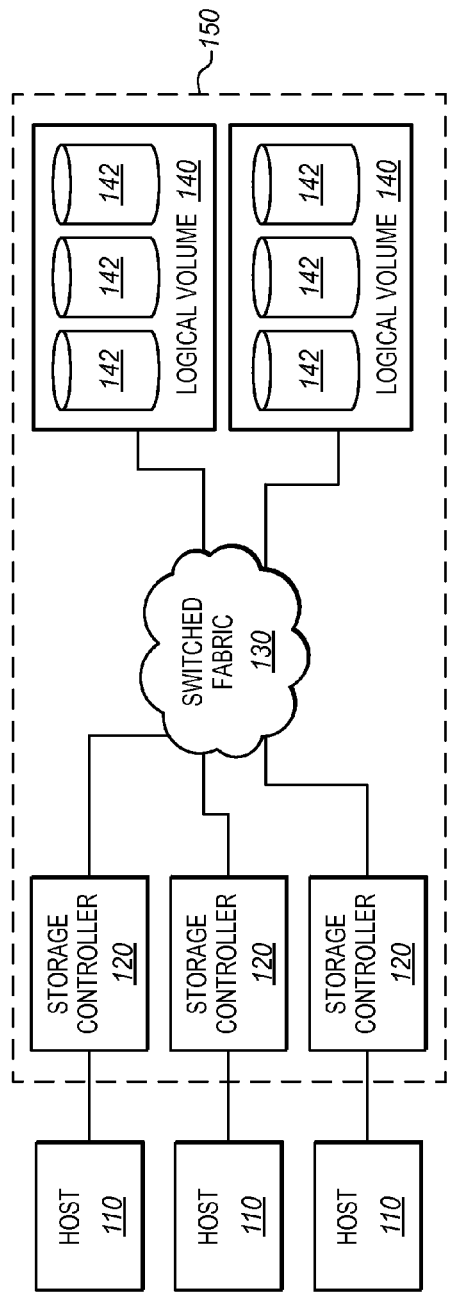
FIG. 1 is a block diagram illustrating an example of a prior art clustered storage system.
Figure 2:
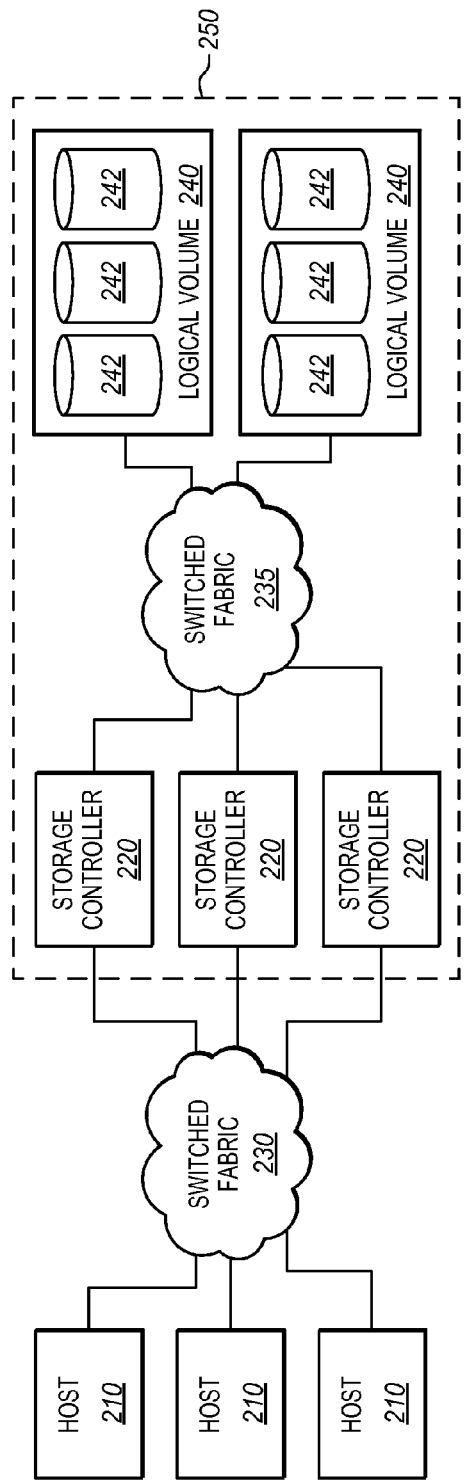
FIG. 2 is a block diagram illustrating another example of a prior art clustered storage system.
Figure 3:
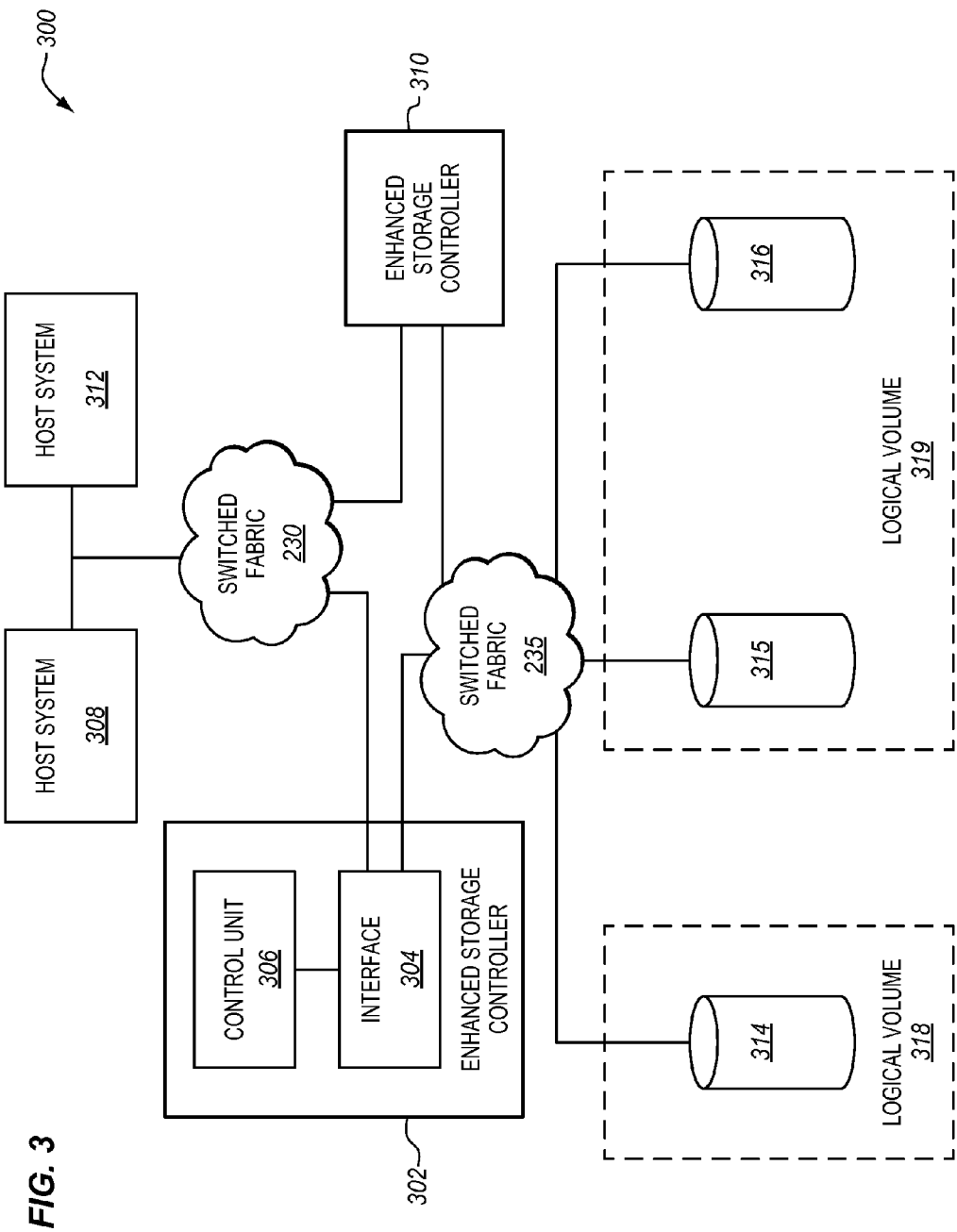
FIG. 3 is a block diagram of an exemplary enhanced storage controller operating within a clustered storage system in accordance with features and aspects hereof to coordinate with other peer storage controllers to assign a unique LUN to a logical volume within the clustered storage system.

FIG. 3 is a block diagram of an exemplary enhanced storage controller 302 operating in clustered storage system 300 in accordance with features and aspects hereof to coordinate with other peer storage controllers to assign a unique LUN to a logical volume within clustered storage system 300. FIG. 3 illustrates a host system 308 coupled with storage controller 302 via switched fabric 230. Storage controller 302 communicatively couples host system 308 with one or more storage devices 314-316 via switched fabric 235. Storage devices 314-316 may also comprise any system for persistently storing data, such as previously described for storage devices 142 and 242 of FIG. 1 and FIG. 2, respectively.

Storage controller 302 of FIG. 3 comprises an interface 304 and a control unit 306. Control unit 306 may be implemented, for example, as custom circuitry, as a special or general purpose processor executing programmed instructions stored in an associated program memory, or some combination thereof. Managing the operations of storage controller 302 includes processing I/O requests directed to logical volumes 318-319, storage devices 314-316, etc. Control unit 306 utilizes interface 304 to communicate with storage devices 314-316. Interface 304 represents an abstraction of one or more interface components in a typical storage controller such as controller 302. Typically a back end interface component of a controller enables communication between the controller and one or more storage devices (i.e., through a switched fabric such as SAS, Fibre Channel, Ethernet, etc.). A front end interface component, usually distinct from the back end interface component, is typically used to enable communication between the storage controller and one or more attached host systems. Where the storage controller is integral with a host system (such as in a system such as prior art architecture of FIG. 1), the front end interface may provide communication through system interface such as Peripheral Component Interconnect (PCI) or PCI-Express. Where the storage controller is external from any particular host system but rather integral within a storage system that is coupled with a plurality of host systems (such as the architecture of FIG. 2), the front end interface may couple the controller to a plurality of host systems through a switched fabric such as SAS, Fibre Channel, Ethernet, etc.

In a clustered storage environment, each storage controller 302 is coupled with all other storage controllers (e.g., 310) of the clustered system. Any suitable communication channel (also represented by the abstraction of interface 304) may be used for such inter-controller communications (e.g., the front end interface used for host system communication, the back end interface used for storage device communication, or some dedicated inter-controller communication channel). Thus, the abstraction of interface 304 represents any such configuration suitable for a particular application that allows a storage controller to communicate with a plurality of storage devices, with other storage controllers, and with one or more host systems.

In prior clustered storage systems, storage controllers would assign a local LUN based on LUNs in use at the storage controller. As described previously, this may be problematic for logical volumes that are shared and accessed by storage controllers and host systems in a clustered storage system due to LUN translations that are required as I/O operations are shipped from controller to controller. Enhanced storage controller 302 solves this and other problems by coordinating with other peer storage controllers to assign a unique LUN to a logical volume within the clustered storage system.

For example, control unit 306 may receive instructions from a host, system such as host system 308, to provision a new logical volume 318 on storage device 314. Prior to exposing logical volume 318 to other controllers and other host systems in clustered storage system 300 (e.g., storage controller 310 and host system 312), control unit 306 generates a proposed LUN for logical volume 318. As a starting point for determining a LUN, control unit 306 may analyze information about other logical volumes that control unit 306 is aware of. This may allow control unit 306 to efficiently choose a proposed LUN to start with. Control unit 306 may also query other storage controllers to identify a list of LUNs that are already in use. In response to generating a proposed LUN, control unit 306 communicates with other storage controllers within clustered storage system 300 and requests that the other storage controllers determine if the proposed LUN is in use. For instance, control unit 306 may transmit the proposed LUN to storage controller 310, and storage controller 310 may compare the proposed LUN to a bitmap of LUNs that are in use. Control unit 306 may then receive a response from storage controller 310 indicating whether the proposed LUN is in use by storage controller 310. The proposed LUN may be in use by storage controller 310 if storage controller 310 owns a logical volume that utilizes the proposed LUN.

If another storage controller, such as storage controller 310, indicates that the proposed LUN is in use (e.g., such as transmitting a response to storage controller 302 indicating such), then control unit 306 will generate a new proposed LUN and re-try coordinating with the other peer controllers to determine if the new proposed LUN is in use. Control unit 306 may attempt to locate a free LUN using a bitmap of LUNs that are in use. If the other storage controllers indicate that the proposed LUN is not in use, then control unit 306 assigns the proposed LUN to the logical volume (e.g., logical volume 318). Control unit 306 may then expose logical volume 318 to storage controller 310, host system 308, and host system 312 to allow elements across clustered storage system 300 to access logical volume 318 using the same unique LUN.

Using enhanced storage controller 302 within clustered storage system 300 provides a number of advantages in terms of controlling how clustered storage is implemented. For example, because storage controllers coordinate with other peer storage controllers to generate unique LUNs for logical volumes, host systems and storage controllers utilize the same LUNs for accessing the same logical volumes. This reduces LUN translations by controllers when accessing the shared logical volumes, and also reduces the confusion a user may experience when accessing or administrating the same shared logical volume at different host systems in the clustered storage system.

FIG. 4 is a flowchart describing an exemplary method 400 in accordance with features and aspects hereof for coordinating with other peer storage controllers to assign a LUN to a logical volume that is unique within the clustered storage system. The method of FIG. 4 may be operable in a storage controller such as described above with regard to storage controller 302 of FIG. 3. More specifically, method 400 may be operable in control unit 306 of FIG. 3.

Step 402 comprises generating, by a storage controller, a proposed LUN for a logical volume provisioned at a storage device. Determining a starting point for selecting a proposed LUN may be performed in a variety of ways, including referring to a LUN table (e.g., a volume mapping table) internal to the controller to determine if a LUN is in use, querying an external system storing a LUN table, etc.

Step 404 comprises communicating, by the storage controller, with each of the other storage controllers within the clustered storage system, requesting that the other storage controllers determine if the proposed LUN is in use. In communicating with other storage controllers, the proposed LUN may be transmitted to each of the other storage controllers along with a request indicating that each of the other storage controllers is tasked with determining if the proposed LUN is in use. Each of the other storage controllers may determine such by referring to an internal LUN table regarding LUNs in use by a corresponding storage controller, etc. Each other controller replies to the controller indicating its knowledge of whether the proposed LUN is available. Further, a Serial Attached SCSI (SAS) message may be used to communicate with the other storage controllers.

Step 404 comprises determining if the proposed LUN is in use. If the proposed LUN is in use, then step 408 is performed. If the proposed LUN is not in use, then step 410 is performed. Step 410 comprises assigning the proposed LUN to the logical volume. Step 410 is the result of the proposed LUN not being in use by other storage controllers within the clustered storage system. In this case, the proposed LUN is unique within the clustered storage system. After the proposed LUN is assigned to the logical volume, it may be exposed to host systems and storage controllers throughout the clustered storage system using the unique LUN. As the LUN is unique, hosts and storage controllers throughout the clustered storage system may issue I/O requests using a common, unique, LUN. In the event that I/O is shipped from controller to controller, it is not necessary for controllers to perform LUN translation as in prior art systems. This reduces the computational requirements on controllers in the clustered storage system and therefore, improves the performance of the clustered storage system. This also reduces the confusion that may be experienced by a user that may access a shared logical volume across different host systems.

Step 408 is performed when the proposed LUN is in use. Step 408 comprises generating a new proposed LUN. In response to generating a new proposed LUN, step 404 is performed to re-try communicating the new proposed LUN to the other storage controllers. Generating a new proposed LUN and re-trying communicating the new proposed LUN (to determine if the new proposed LUN is in use) may be performed repetitively until a LUN is identified that is unique across the clustered storage system.

While the invention has been illustrated and described in the drawings and foregoing description, such illustration and description is to be considered as exemplary and not restrictive in character. Some embodiments of the invention and minor variants thereof have been shown and described. In particular, features shown and described as exemplary software or firmware embodiments may be equivalently implemented as customized logic circuits and vice versa. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A plurality of storage controllers within a clustered storage system, each of the storage controllers communicatively coupling host systems with storage devices, wherein each of the storages controllers comprises:
    an interface operable to communicate with other storage controllers within the clustered storage system; and
    a control unit operable to generate a proposed Logical Unit Number (LUN) for a logical volume provisioned at the storage devices, and to communicate with each of the other storage controllers within the clustered storage system requesting that the other storage controllers determine if the proposed LUN is in use,
    responsive to determining that the proposed LUN is not in use by the other storage controllers, the control unit is further operable to:
        assign the proposed LUN to the logical volume; and
    responsive to determining that the proposed LUN is in use by at least one of the other storage controller, the control unit is further operable to:
        generate a new proposed LUN;
        re-try communication with each of the other storage controllers requesting that the other storage controllers determine if the new proposed LUN is in use; and
        assign the new proposed LUN to the logical volume responsive to determining that the new proposed LUN is not in use by the other storage controllers.

2. The plurality of storage controllers of claim 1 wherein:
    the control unit is further operable to transmit the proposed LUN to each of the other storage controllers requesting that the other storage controllers determine if the proposed LUN is in use,
    the control unit further operable to receive a response from each of the other storage controllers indicating whether the proposed LUN is in use by a corresponding storage controller,
    the control unit further operable to process each response and to:
        assign the proposed LUN to the logical volume if each response indicates that the LUN is not in use by a corresponding storage controller; and
        generate a new proposed LUN and re-transmit the new proposed LUN to each of the other storage controllers if at least one response indicates that the LUN is in use by a corresponding storage controller.

3. The plurality of storage controllers of claim 2 wherein:
    the control unit is further operable to transmit the proposed LUN to each of the other storage controllers within a Serial Attached SCSI (SAS) message.

4. The plurality of storage controllers of claim 3 wherein:
    the control unit is further operable to receive the response from each of the other storage controllers within a SAS message indicating whether the proposed LUN is in use.

5. The plurality storage controllers of claim 1 wherein:
    the control unit is further operable to broadcast a message to each of the other storage controllers to register the proposed LUN responsive to the proposed LUN not being in use by the other storage controllers.

6. The plurality storage controllers of claim 5 wherein:
    the control unit is further operable to expose, to the host systems, the logical volume utilizing the proposed LUN in response to registering the proposed LUN with each of the other storage controllers.

7. A method operable on a plurality of storage controllers within a clustered storage system, each of the storage controllers communicatively coupling host systems with storage devices, wherein the method comprises:
    generating, by a storage controller, a proposed Logical Unit Number (LUN) for a logical volume provisioned at the storage devices;
    communicating, by the storage controller, with each of other storage controllers within the clustered storage system requesting that the other storage controllers determine if the proposed LUN is in use;
    determining, by the storage controller, if the proposed LUN is in use by the other storage controllers;
    responsive to determining that that the proposed LUN is not in use by the other storage controllers:
        assigning, by the storage controller, the proposed LUN to the logical volume; and
    responsive to determining that the proposed LUN is in use by at least one of the other storage controllers;
        generating, by the storage controller, a new proposed LUN;
        re-trying communication with each of the other storage controllers requesting that the other storage controllers determine if the new proposed LUN is in use; and assigning the new proposed LUN to the logical volume responsive to determining that the new proposed LUN is not in use by the other storage controllers.

8. The method of claim 7 wherein:

the step of communicating further comprises:
- transmitting the proposed LUN to each of the other storage controllers requesting that the other storage controllers determine if the proposed LUN is in use; and
- receiving a response from each of the other storage controllers indicating whether the proposed LUN is in use by a corresponding storage controller;

the step of determining if the proposed LUN is in use further comprises:
- processing each response received from each of the other storage controllers to determine whether the proposed LUN is in use by a corresponding storage controller.

9. The method of claim 8 wherein the step of transmitting further comprises:
transmitting the proposed LUN to each of the other storage controllers within a Serial Attached SCSI (SAS) message.

10. The method of claim 8 wherein the step of receiving further comprises:
receiving the response from each of the other storage controllers within a SAS message indicating whether the proposed LUN is in use.

11. The method of claim 7 further comprising:
broadcasting a message to each of the other storage controllers to register the proposed LUN responsive to the proposed LUN not being in use by the other storage controllers.

12. The method of claim 11 further comprising:
exposing, to the host systems, the logical volume utilizing the proposed LUN in response to registering the proposed LUN with each of the other storage controllers.

13. A storage controller within a clustered storage system communicatively coupling a host system with storage devices, the storage controller comprising:
an interface operable to communicate with other storage controllers within the clustered storage system; and
a control unit operable to receive a proposed Logical Unit Number (LUN) for a logical volume provisioned by another storage controller within the clustered storage system, and to determine if the proposed LUN is in use by the storage controller, the control unit further operable to:
- transmit a message to the other storage controller indicating that the proposed LUN is not in use responsive to determining that the proposed LUN is not in use by the storage controller; and
- transmit a message to the other storage controller indicating that the proposed LUN is in use responsive to determining that the proposed LUN is in use by the storage controller.

14. The storage controller of claim 13 wherein:
the control unit is further operable to receive the proposed LUN from the other storage controllers within a Serial Attached SCSI (SAS) message.

15. The storage controller of claim 13 wherein:
the control unit is further operable to transmit the message to the other storage controller within a SAS message.

16. The storage controller of claim 13 wherein:
the control unit is further operable to receive a broadcast a message from the other storage controller to register the proposed LUN responsive to the proposed LUN not being in use by the other storage controllers within the clustered storage system, and to register the proposed LUN responsive to the broadcast message.

17. The storage controller of claim 16 wherein:
the control unit is further operable to expose the logical volume utilizing the proposed LUN to a host system in response to registering the proposed LUN.

18. The storage controller of claim 13 wherein:
the control unit is further operable to determine one or more LUNs for logical volumes provisioned by the storage controller, and to determine that the proposed LUN is in use if the one or more LUNs corresponds with the proposed LUN.

* * * * *